United States Patent Office 3,574,723
Patented Apr. 13, 1971

3,574,723
CARBOXYLATION OF AROMATIC ACTING COMPOUNDS
James J. Louvar, Evanston, Ill., assignor to Universal Oil Products Company, Des Plaines, Ill.
No Drawing. Filed Mar. 20, 1968, Ser. No. 714,443
Int. Cl. C07c 63/04, 101/54, 101/56
U.S. Cl. 260—515                    10 Claims

ABSTRACT OF THE DISCLOSURE

Aromatic acting compounds may be carboxylated by treating the compound with a carboxylic acid in the presence of a catalyst comprising a phosphorus-containing acid, a mineral acid or a Friedel-Crafts metal halide to form the desired carboxylated compounds.

---

This invention relates to a process for the carboxylation of aromatic acting compounds, and particularly to a process whereby a carboxyl group is introduced into the nucleus of an aromatic acting compound by utilizing certain catalytic compositions of matter of the type hereinafter set forth in greater detail.

Aromatic acting compounds, whether substituted or unsubstituted in nature, which contain a carboxyl radical on the nucleus thereof will find a wide variety of uses in the chemical field. One of the most important of these carboxylated aromatic acting compounds comprises p-toluic acid. This particular compound is a precursor of terephthalic acid, said terephthalic acid being an important intermediate in the preparation of synthetic fibers, resins, and films, especially when combined with polyhydride alcohols such as glycols. In addition, the aminobenzoic acids such as ortho-aminobenzoic acid (anthranillic acid), meta-aminobenzoic acid, and paraaminobenzoic acid are all useful as intermediates in the preparation of dyes or pharmaceuticals. Likewise, the isomeric nitrobenzoic acids, either ortho-, meta-, or para- in configuration, are useful in organic synthesis in the preparation of antiseptics and as intermediates in the preparation or manufacture of dyes and sun-screening agents. Other carboxylated aromatic acting compounds comprising ortho- or para- chlorobenzoic acids are useful as intermediates in the preparation of dyes, fungicides, pharmaceuticals, and other organic chemicals. In view of the usefulness of these compounds, it is an object of this invention to provide a novel process for the carboxylation of aromatic compounds.

A further object of this invention is found in the process for treating aromatic acting compounds with a carboxylic acid in the presence of certain catalytic compositions of matter.

In one aspect an embodiment of this invention resides in a process for the carboxylation of an aromatic acting compound which comprises treating said compound with a carboxylic acid in the presence of a catalyst comprising a phosphorus-containing acid, a mineral acid or a Friedel-Crafts metal halide at reaction conditions, and recovering the resultant carboxylated aromatic acting compound.

A specific embodiment of this invention is found in a process for the carboxylation of an aromatic acting compound using compounds which comprise treating toluene with acetic acid in the presence of a catalyst comprising phosphoric acid and sulfuric acid at a temperature in the range of from about 100° to about 250° C. and a pressure in the range of from about atmospheric to about 100 atmospheres, and recovering the resultant p-toluic acid.

Other objects and embodiments will be found in the following further detailed description of the present invention.

The present invention is primarily concerned with a process for the carboxylation of aromatic acting compounds. The term "aromatic acting compounds" as used in the present specification and appended claims will refer to monocyclic and polycyclic aromatic compounds as well as heterocyclic compounds, all of which may be substituted or unsubstituted in nature, specific examples of these compounds being hereinafter set forth in greater detail. The desired process of carboxylating these aromatic acting compounds is effected by treating said compounds with a carboxylic acid in the presence of a catalyst comprising a phosphorus-containing acid, a mineral acid or a Friedel-Crafts metal halide at condensation conditions. These condensation conditions will include an elevated temperature in the range of from about 100° to about 250° C. and a pressure in the range of from about atmospheric to about 100 atmospheres. In the event that the reaction is to be effected at elevated pressures, the necessary pressure will be supplied by introducing an inert gas such as nitrogen into the reaction vessel until the desired operating pressure has been reached, said pressure being that which is sufficient to maintain a major portion of the reactants in the liquid phase.

Examples of carboxylic acids which may be used will include both monocarboxylic and polycarboxylic acid either saturated or unsaturated in nature. Some specific examples of these acids will include fatty acids such as formic acid, acetic acid, propionic acid, butyric acid, valeric acid, caproic acid, enanthylic acid, etc.; unsaturated acids such as acrylic acid; the butenic acids, such as crotonic acid, isocrotonic acid, vinylacetic acid, methylacrylic acid; the pentenic acids such as tiglic acid, angelic acid, senecioic acid, the hexenic acids, etc.; the acetylene acids such as propynoic acid, tetrolic acid, pentinoic acid, etc.; dicarboxylic acids such as the oxalic acids including oxalic acid, malonic acid, succinic acid, glutaric acid, adipic acid, pimelic acid, suberic acid, etc.; the pumaric acids such as pumaric acid, maleic acid, glutaconic acid, citraconic acid, itaconic acid, ethidene-malonic acid, mesaconic acid, allylmalonic acid, propylidena-malonic acid, hydromuconic acid, pyrocinchonic acid, allyl-succinic acid, teraconic acid, etc. In the preferred embodiment of the invention, the carboxylic acid which is used will comprise acetic acid or propionic acid due to their relatively greater availability and correspondingly lesser cost. It is to be understood that the aforementioned acids are only representative of the class of acids which may be used and that the present invention is not necessarily limited thereto.

Examples of aromatic acting compounds which may be used as the starting material of the process of this invention will comprise monocyclic aromatic compounds, polycyclic aromatic compounds, and heterocyclic compounds which may be substituted or which may contain a substituent selected from the group consisting of alkyl containing from about 1 to about 20 carbon atoms, aryl, alkaryl, aralkyl, cycloalkyl, alkoxy, halogen, nitro, amino, heterocyclic, acetoxy, etc. radicals. Some specific examples of these compounds will include benzene, toluene, ethylbenzene, n-propylbenzene, isopropylbenzene (cumene), n-butylbenzene, t-butylbenzene, etc.; phenylbenzene, m-tolylbenzene, o-tolylbenzene, p-tolylbenzene, o-ethylphenylbenzene, m-ethylphenylbenzene, p-ethylphenylbenzene, diphenylethane, diphenylpropane, etc.; cyclopentylbenzene, cyclohexylbenzene, cycloheptylbenzene, etc.; anisole, phenetole, propylphenyl ether, isopropylphenyl ether, butylphenyl ether, etc.; chlorobenzene, bromobenzene, iodobenzene, aniline, nitrobenzene, 1-methylnaphthalene, 2-methylnaphthalene, 4-methylnaphthalene, 1-ethylnaphthalene, 2-ethylnaphthalene, 4-ethylnaphthalene, 1-propylnaphthalene, 2-propylnaphthalene, 4-propylnaphthalene, 1-phenylnaphthalene, 2-phenylnaphthalene, 4-phenylnaphthalene, 1-benzylnaphthalene, 2-benzylnaphthalene, 4 - benzylnaphthalene, 1 - (o - tolyl)naphthalene, 1 - (m - tolyl)naphthalene, 1 - (p-tolyl)naphthalene, 2-(o-tolyl)naphthalene, 2 - (m - tolyl)naphthalene, 2-(p-tolyl) naphthalene, 4 - (o - tolyl)naphthalene, 4-(m-tolyl)naphthalene, 4-(p-tolyl)naphthalene, 1-methoxynaphthalene, 2-methoxynaphthalene, 4-methoxynaphthalene, 1-ethoxynaphthalene, 2-ethoxynaphthalene, 4-ethoxynaphthalene, 1-propoxynaphthalene, 2-propoxynaphthalene, 4-propoxynaphthalene, 1-chloronaphthalene, 2-chloronaphthalene, 4-chloronaphthalene, 1-bromonaphthalene, 2-bromonaphthalene, 4-bromonaphthalene, 1-nitronaphthalene, 2-nitronaphthalene, 4 - nitronaphthalene, 1 - aminonaphthalene, 2-aminonaphthalene, 4-aminonaphthalene, etc.; the correspondingly substituted anthracenes, phenanthrenes, chrysenes, pyrenes, etc.; furan, thiofuran, pyrrole, 2-methylfuran, 3 - methylfuran, 2 - ethylfuran, 3-ethylfuran, 2-propylfuran, 3-propylfuran, 2-chlorofuran, 3-chlorofuran, 2-bromofuran, 3-bromofuran, 2-methylthiofuran, 3 - methylthiofuran, 2 - ethylthiofuran, 3 - ethylthiofuran, 2-propylthiofuran, 3-propylthiofuran, 2-chlorothiofuran, 3-chlorothiofuran, 2-bromothiofuran, 3-bromothiofuran, 2-methylpyrrole, 3-methylpyrrole, 2-ethylpyrrole, 3-ethylpyrrole, 2-propylpyrrole, 3-propylpyrrole, 2-chloropyrrole, 3-chloropyrrole, 2-bromopyrrole, 3-bromopyrrole, etc.; pyran, thiapyran, pyridine, 2-methylpyran, 3-methylpyran, 2-ethylpyran, 3-ethylpyran, 2-propylpyran, 3-propylpyran, 2-chloropyran, 3-chloropyran, 2-bromopyran, 3-bromopyran, 2-methylthiapyran, 3-methylthiapyran, 2-ethylthiapyran, 3-ethylthiapyran, 2-propylthiapyran, 3-propylthiapyran, 2-chlorothiapyran, 3-chlorothiapyran, 2-bromothiapyran, 3 - bromothiapyran, 2 - methylpyridine, 3-methylpyridine, 2-ethylpyridine, 3-ethylpyridine, 2-propylpyridine, 3-propylpyridine, 2-chloropyridine, 3-chloropyridine, 2-bromopyridine, 3-bromopyridine, etc. It is to be understood that the aforementioned aromatic compounds are only representative of the class of compounds which may be used in the carboxylation reaction, and that the present invention is not necessarily limited thereto.

The catalytic compositions of matter which are used to promote the action of the present invention comprise those catalysts which comprise a phosphorus-containing acid, a mineral acid, a Friedel-Crafts metal halide or hydrogen fluoride. In addition, the catalyst may also contain sulfuric acid as an additive thereof. Examples of phosphorus-containing acids which may be used include orthophosphoric acid and other related acids in which the phosphorus possesses a valence of 5, including pyrophosphoric acid, tetraphosphoric acid, triphosphoric acid, hexametaphosphoric acid, polyphosphoric acid, phosphorus pentoxide, as well as mixtures of these phosphoric acids. In the preferred embodiment of the invention the phosphorus-containing acid will comprise a phosphoric acid mixture which is generally referred to as polyphosphoric acid. Polyphosphoric acid is formed by heating orthophosphoric acid which possesses a formula $H_3PO_4$ or pyrophosphoric acid which corresponds to the formula $H_4P_2O_7$ or mixture thereof in suitable equipment such as carbon lined trays heated by flue gases or other suitable means to produce a phosphoric acid mixture generally analyzing from about 79 to about 85% by weight of $P_2O_5$. Such a liquid mixture of phosphoric acids with a 79.5% $P_2O_5$ content was found by analysis to contain 24.5% of orthophosphoric acid ($H_3PO_4$), 45.2% of pyrophosphoric acid ($H_4P_2O_7$), 26.0% of triphosphoric acid ($H_5P_3O_{10}$), and 4.3% by weight of unidentified phosphoric acids. Another polyphosphoric mixture somewhat more concentrated than the one just referred to in having a $P_2O_5$ content of 84% by weight was found by analysis to contain about 57% by weight of triphosphoric acid ($H_6P_3O_{10}$), 17% by weight of hexamethaphosphoric acid [$(HPO_3)_6$], 11% by weight of pyrophosphoric acid ($H_3PO_4$), and 10% by weight of unidentified phosphoric acid. This polyphosphoric acid is then admixed with sulfuric acid in a ratio of 0.35 mole of polyphosphoric acid to 0.10 mole of sulfuric acid to prepare the desired catalyst.

Another type of catalyst which may be used comprises a catalyst known in the trade as Solid Phosphoric Acid. This catalyst comprises a phosphorus-containing acid composited on a solid support, preferably a solid siliceous material. The finely divided solid siliceous materials which may be employed as adsorbents or carriers for oxygen acids or phosphoric acids may be divided into two classes, the first class comprising materials of predominantly siliceous character such as artificially prepared porous silica and diatomaceous earths, including diatromites known under the trade names as "Celite," "Celite FC," "Dicalite I," "Dicalite II," etc., said diatomites being naturally occurring kieselguhrs which are dried by heating at a temperature in the range of from about 205° to about 360° C. and comprising about 90% silica by difference, the reactor being accounted for by various material oxides and approximately 3.7% ignition loss. The second class of materials which may be employed either alone or in conjunction with the first class comprises generally certain members of the class of aluminum silicates and includes such naturally occurring substances as various fuller's earths and clays such as bentonite, montmorillonite, acid-treated clays, and the like.

Each adsorbent or supporting material which may be used will exert its own specific influence upon the net effectiveness of the catalyst composite which will not be necessarily identical with that of other members of the class.

In producting a catalyst composite which may be utilized to effect the carboxylation of an aromatic acting compound, an oxygen acid of phosphorus and a solid siliceous material are mixed at a temperature of from about 10° to about 232° C. and preferably at a temperature of about from 95° to about 180° C. to form a composite. For example, polyphosphoric acid may be heated to a temperature of about 170° C. and thereafter admixing the hot acid with diatomaceous earth which has been previously present at room temperature. The polyphosphoric acid and diatomaceous earth form a composite which is slightly moist to almost dry in appearance but which becomes plastic when subjected to pressure in a hydraulic press-type or auger-type extruder by which the composite is formed into pieces which are thereafter cut into shaped particles. The resultant catalyst composite, while it is still hot, is thus extruded through a dye which has been preheated to a temperature of about 170° C. The extruded particles of catalyst are then calcined by heating the air, nitrogen, flue gas, or some other inert gas at a temperature of from about 550° to about 900° C. for a time of from about 0.25 to about 8 hours to form a substantially granular catalytic material.

It is also contemplated within the scope of this invention that other catalysts such as hydrogen fluoride and the Friedel-Crafts metal halides such as aluminum chloride, aluminum bromide, zinc chloride, ferric chloride, etc. may also be used in the carboxylation of aromatic acting compounds, however, not necessarily with equivalent results.

The process of this invention may be effected in any suitable manner and may comprise either a batch or continuous type operation. For example, when a batch type operation is used, a quantity of the aromatic acting compounds which is to undergo carboxylation and the carboxylic acid are placed in an appropriate apparatus which may comprise a flask or, if superatmospheric pressures are to be employed, an autoclave of the rotating or mixing type along with the catalyst comprising a phosphorus-containing compound. If, as hereinbefore set forth, an autoclave is used as the reaction vessel, the autoclave is sealed, pressured with a substantially inert gas such as nitrogen until the desired operating pressure is reached, and thereafter heated to the pre-determined operating temperature. The vessel and contents thereof are maintained at the desired operating temperature for a residence time which may range from about 0.5 up to about 10 hours or more in duration. At the end of this reaction time, the vessel and contents thereof are allowed to return to room temperature, any excess pressure, if present, is discharged, and the reaction mixture is recovered. The aforesaid reaction mixture is then treated in a conventional manner such as washing with water, extraction with a solvent, filtration, fractional distillation, fractional crystallation, etc. whereby the desired carboxylated aromatic acting compound is separated from any unreacted starting material and/or undesired side products which may have been formed during the reaction, and recovered.

It is also contemplated within the scope of this invention that the carboxylation process may also be effected in a continuous manner of operation. When this type of operation is used, a reaction vessel is maintained at the proper operating conditions of temperature and pressure within the reaction conditions hereinbefore set forth. The aromatic acting compound which is to undergo carboxylation is continuously charged to the reactor as in the carboxylic acid. These reactants may be charged to the reactor through separate lines, or, if so desired, they may be admixed prior to entry into said reactor and charged thereto in a single stream. In addition, the catalyst is also charged to the reactor or in an alternative method, may be admixed with one or both of the reactants before charging said reactants or reactants to the vessel.

When utilizing a catalyst of the type hereinbefore set forth in greater detail which is in a solid state such as Solid Phosphoric Acid, the continuous type of reaction may be effected in a fixed bed type of operation. The catalyst is disposed as a fixed bed in the reaction zone and the aromatic acting compound and the carboxylic acid are passed through said bed in either an upward or downward flow. In addition, the moving bed type of operation may also be employed in which the catalyst and the reactants pass either concurrently or countercurrently to each other through the reaction zone. Another type of operation which may be used comprises the slurry type in which the catalyst is carried into the reaction zone as a slurry in one or both of the reactants.

Upon completion of the desired residence time, the reactor effluent is continuously withdrawn and subjected to separation means whereby the unreacted aromatic acting compound and carboxylic acid are separated from the desired carboxylated aromatic compound, the latter being recovered while the former two reactants are recycled to form a portion of the feed stock.

Examples of carboxylated aromatic acting compounds which may be prepared according to the process of this invention will include benzoic acid, o-toluic acid, m-toluic acid, p-toluic acid, o-ethylbenzoic acid, m-ethylbenzoic acid, m-ethylbenzoic acid, p-ethylbenzoic acid, o-propylbenzoic acid, m-propylbenzoic acid, p-propylbenzoic acid, o-isopropylbenzoic acide, m-isopropylbenzoic acid, p-isopropylbenzoic acid, o-phenylbenzoic acid, m-phenylbenzoic acid, m-phenylbenzoic acid, o-(p-tolyl)benzoic acid, m-(p-tolyl)benzoic acid, p-(p-tolyl)benzoic acid, o-cyclopentylbenzoic acid, m-cyclopentylbenzoic acid, p-cyclopentylbenzoic acid, o-chlorobenzoic acid, m-chlorobenzoic acid, p-chlorobenzoic acid, o-bromobenzoic acid, m-chlorobenzoic acid, p-chlorobenzoic acid, o-bromobenzoic acid, m-bromobenzoic acid, p-bromobenzoic acid, o-aminobenzoic acid, m-aminobenzoic acid, p-aminobenzoic acid, o-nitrobenzoic acid, m-nitrobenzoic acid, p-nitrobenzoic acid, o-methoxybenzoic acid, m-methoxybenzoic acid, p-methoxybenzoic acid, o-ethoxybenzoic acid, m-ethoxybenzoic acid, p-ethoxybenzoic acid, naphthoic acid, 2-methyl naphthoic acid, 2-ethylnaphthoic acid, 4-methylnaphthoic acid, 4-ethylnaphthoic acid, furan carboxylic acid, thiofuran carboxylic acid, pyrrole carboxylic acid, pyran carboxylic acid, thiapyran carboxylic acid, pyridine carboxylic acid, 2-methyl-4-furan carboxylic acid, 2-chloro-4-furan carboxylic acid, 2-ethyl-4-thiofuran carboxlyic acid, 2-methyl-4-pyrrole carboxylic acid, 3-methyl-5-pyran carboxylic acid, 2-methyl-5-thiapyran carboxylic acid, 2-chloro-5-pyridine carboxylic acid, etc. It is to be understood that the aforementioned carboxylated aromatic acting compounds are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example 146 grams (1.6 mole) of toluene, 50 grams of the catalyst comprising a mixture of 40 grams of polyphosphoric acid and 10 grams of sulfuric acid along with 60 grams (1.0 mole) of acetic acid is placed in the glass liner of a rotating autoclave. The liner is sealed into the autoclave and nitrogen pressed in until an initial pressure of 75 pounds per square inch is reached. The autoclave is then heated to a temperature of 125° C. and maintained at this temperature and rotated for a period of 4 hours. At the end of this time, the autoclave and contents thereof are allowed to cool to room temperature, the excess pressure is discharged, and the reaction product is recovered. The product is then washed with water and extracted with benzene. The aquoues layer is separated from the organic layer, the latter is then filtered and heated in a rotating film evaporator at reduced pressure to remove the benzene solvent. The desired product comprised toluic acids which are identified by means of infrared analysis.

EXAMPLE II

A mixture of 53 grams (0.5 mole) of ethylbenzene and 5 grams of a solid phosphoric acid catalyst along with 30 grams (0.5 mole) of acetic acid is placed in the glass liner of a rotating autoclave. Following this, the autoclave is sealed and nitrogen is pressed in until an initial pressure of 100 pounds per square inch is reached. The autoclave is then heated to a temperature of about 150° C. and maintained thereat for a period of about 4 hours, accompanied by constant rotation. At the end of this time, the autoclave and contents thereof are allowed to return to room temperature, the excess pressure is discharged and the reaction mixture is recovered. The mixture is then water washed and extracted with benzene following which the aqueous layer is separated from the organic layer. The organic layer is then filtered and the benzene solvent is removed by means of evaporation under reduced pressure. The desired product comprising ethylbenzoic acids is separated and recovered.

EXAMPLE III

A mixture comprising 46.5 grams (0.5 mole) of aniline, 5 grams of a polyphosphoric acid-sulfuric acid catalyst and 37 grams (0.5 mole) of propionic acid is placed in the glass liner of a rotating autoclave and treated in a manner similar to that set forth in the above examples. Upon completion of the desired residence time, the autoclave is cooled to room temperature, the excess pressure is discharged and the reaction mixture is recovered. The reaction mixture is washed with water, extracted with benzene, and the aqueous layer is separated from the organic layer. The organic layer, after filtration, is heated under reduced pressure in order to remove the benzene solvent. The desired product comprising aminobenzoic acids is recovered by means of fractional distillation.

EXAMPLE IV

In this example a mixture of 66 grams (0.5 mole) of cumene, 30 grams (0.5 mole) of acetic acid and 5 grams of hydrogen fluoride is placed in the glass liner of a rotating autoclave. The autoclave is sealed, nitrogen is pressed in until a range of 100 pounds per square inch is reached, and thereafter the autoclave is heated to a temperature of about 150° C. After maintaining the autoclave and contents thereof at this temperature for a period of approximately 4 hours, the autoclave is cooled to room temperature, the excess pressure is vented, and the reaction mixture is recovered. After treatment of the reaction mixture in a manner similar to that set forth in the above examples, the desired product comprising isopropylbenzoic acids is recovered.

EXAMPLE V

In this example a mixture of 71 grams (0.5 mole) of 2-methylnaphthalene, 30 grams (0.5 mole) of acetic acid, and 5 grams of aluminum chloride is placed in the glass liner of a rotating autoclave. The autoclave is sealed and nitrogen is pressed in until an initial pressure of 100 pounds per square inch is reached. The autoclave is then heated to a temperature of about 150° C. and maintained thereat for a period of about 4 hours while subjecting the autoclave to constant rotation. At the end of this time, heating is discontinued, the autoclave is allowed to return to room temperature, and the excess pressure is discharged. The autoclave is then opened and the reaction mixture is recovered. The reaction mixture is then washed with water and extracted with the benzene solvent. Following separation of the aqueous layer from the organic layer, the latter is filtered and heated under reduced pressure in order to remove the aforesaid benzene solvent. The desired product comprising 2-methylnaphthoic acids is recovered by means of fractional distillation.

I claim as my invention:

1. A process of carboxylating an aromatic acting compound with a carboxylic acid in the presence of at least one catalyst selected from the group consisting of a phosphorus-containing acid, a mineral acid and a Friedel-Crafts metal halide.

2. The process as set forth in claim 1, further characterized in that the carboxylation is effected at a temperature in the range of from about 100° to about 250° C. and a pressure in the range of from about atmospheric to about 100 atmospheres.

3. The process of claim 2 further characterized in that the aromatic acting compound and the carboxylic acid are reacted in approximately equimolar proportion and for a residence time of from about 0.5 to about 10 hours.

4. The process as set forth in claim 1, further characterized in that said carboxylic acid is acetic acid.

5. The process as set forth in claim 1, further characterized in that said carboxylic acid is propionic acid.

6. The process as set forth in claim 1, further characterized in that said catalyst is a mixture of polyphosphoric acid and sulfuric acid.

7. The process as set forth in claim 1, further characterized in that said aromatic acting compound is toluene.

8. The process as set forth in claim 1, further characterized in that said aromatic acting compound is ethylbenzene.

9. The process as set forth in claim 1, further characterized in that said aromatic acting compound is 2-methylnaphthalene.

10. The process as set forth in claim 1, further characterized in that said aromatic acting compound is aniline.

References Cited

Fieser, L. F., Reagents for Organic Synthesis, Pub. by Wiley and Sons, Inc. (New York) QD 262, p. 5 c.3 (1967).

LORRAINE A. WEINBERGER, Primary Examiner

L. A. THAXTON, Assistant Examiner

U.S. Cl. X.R.

260—295, 326.3, 327, 332.2, 345.7, 347.3, 518, 520, 521